(12) United States Patent
Zhuang et al.

(10) Patent No.: US 11,974,027 B2
(45) Date of Patent: Apr. 30, 2024

(54) SYSTEM AND METHOD FOR REAL-TIME TRANSMISSION OF A PANORAMIC VIDEO

(71) Applicant: BEIJING UNIVERSITY OF POSTS AND TELECOMMUNICATIONS, Beijing (CN)

(72) Inventors: Zirui Zhuang, Beijing (CN); Jingyu Wang, Beijing (CN); Huairuo Xu, Beijing (CN); Haifeng Sun, Beijing (CN); Daoxu Sheng, Beijing (CN); Jing Wang, Beijing (CN)

(73) Assignee: BEIJING UNIVERSITY OF POSTS AND TELECOMMUNICATIONS, Beijing (CN)

( * ) Notice: Subject to any disclaimer, the term of this patent is extended or adjusted under 35 U.S.C. 154(b) by 0 days.

(21) Appl. No.: 18/115,110

(22) Filed: Feb. 28, 2023

(65) Prior Publication Data

US 2023/0345085 A1 Oct. 26, 2023

(30) Foreign Application Priority Data

Apr. 25, 2022 (CN) .......................... 202210442042.5

(51) Int. Cl.
*H04N 21/81* (2011.01)
*H04N 21/24* (2011.01)
(Continued)

(52) U.S. Cl.
CPC ....... *H04N 21/816* (2013.01); *H04N 21/2407* (2013.01); *H04N 21/41407* (2013.01); *H04N 21/6405* (2013.01); *H04N 21/64769* (2013.01)

(58) Field of Classification Search
CPC ............ H04N 21/816; H04N 21/2407; H04N 21/41407; H04N 21/6405; H04N 21/64769
See application file for complete search history.

(56) References Cited

U.S. PATENT DOCUMENTS

| | | | |
|---|---|---|---|
| 11,375,284 B2 * | 6/2022 | Stokking | H04L 12/1859 |
| 2018/0074679 A1 * | 3/2018 | Wang | H04N 21/6587 |

(Continued)

FOREIGN PATENT DOCUMENTS

| | | | |
|---|---|---|---|
| CN | 111083121 A | 4/2020 | |
| CN | 112714315 A | 4/2021 | |

(Continued)

OTHER PUBLICATIONS

References cited in the First Office Action of the priority CN application No. 202210442042.5 dated Dec. 5, 2022.

(Continued)

*Primary Examiner* — Mulugeta Mengesha
(74) *Attorney, Agent, or Firm* — Baratta Law PLLC; Lawrence A. Baratta, Jr.

(57) ABSTRACT

A system and method for real-time transmission of a panoramic video, which propose a new grouping method and bitrate decision method specifically for a panoramic 360-degree video. The grouping method takes into account fields of view of different users, thus effectively reducing the bandwidth consumption of repeated video segments, while ensuring user fairness and making full use of network bandwidth resources when allocating resources. The system and method of the invention can maximize the long-term QoE of users under the condition of limited bandwidth, and avoid the problem that the existing schemes are complex and difficult to meet real-time requirements of users.

4 Claims, 2 Drawing Sheets

(51) Int. Cl.
*H04N 21/414* (2011.01)
*H04N 21/6405* (2011.01)
*H04N 21/647* (2011.01)

(56) References Cited

U.S. PATENT DOCUMENTS

2018/0146216 A1    5/2018  Chang et al.
2019/0387214 A1*  12/2019  Huang ................ H04L 65/1059
2020/0137462 A1*  4/2020  He .................. H04N 21/234363
2021/0092347 A1*  3/2021  Han ..................... H04N 13/282
2022/0109713 A1    4/2022  Huang et al.

FOREIGN PATENT DOCUMENTS

| | | |
|---|---|---|
| CN | 112929691 A | 6/2021 |
| CN | 112995636 A | 6/2021 |
| CN | 113194362 A | 7/2021 |
| CN | 113573140 A | 10/2021 |
| CN | 113905221 A | 1/2022 |
| CN | 114071240 A | 2/2022 |
| CN | 114125452 A | 3/2022 |

OTHER PUBLICATIONS

References cited in the Notice of Allowance of the priority CN application No. 202210442042.5 dated Jan. 28, 2023.

* cited by examiner

SYSTEM AND METHOD FOR REAL-TIME TRANSMISSION OF A PANORAMIC VIDEO

TECHNICAL FIELD

The present invention relates to a system and method for real-time transmission of a panoramic video, belonging to the technical field of information, and in particular belonging to the technical field of 360-degree video multicast.

BACKGROUND

Mobile data traffic has increased 18 times in past five years, and is expected to continue to grow at an annual growth rate of 47% in the next few years. Most (60%-80%) mobile data traffic carries video content. In order to partially meet this huge demand, cellular network operators have been considering providing multicast services for live streaming video sessions (such as popular sports events and concerts) recently. A unicast service cannot support large-scale real-time sessions, because the required radio resources increase linearly with the number of users, even if all users receive the same content at the same time. Multicast provides an efficient and scalable method to stream real-time video to many users. For example, a transmission rate provided by multimedia broadcast multicast service (MBMS) for multicast groups depends on users with the worst channel quality. The multicast broadcast single frequency network (MBSFN) can transmit the same signal in a MBMS area, and transmit it synchronously among multiple base station cells within the area.

With the development of video multicast technology, more and more new researches propose user grouping and wireless resource allocation based on video multicast. In existing solutions, traditional single-view videos are mostly considered, and a special situation of panoramic video, that is, 360-degree video, such as field of view of users during viewing, is not taken into account. The advantage of use of multicast is to aggregate repeated video content. If a large number of users with different field of view are aggregated into one group, the effectiveness of multicast will be reduced, and network resources will not be fully utilized. In addition, a bitrate decision method of the existing solutions simply pursues the maximum utilization of resources and ignores the QoE experience of users, which will lead to frequent bitrate switching in the network fluctuation environment, resulting in a significant reduction of QoE of users.

To sum up, how to stream 360-degree video to mobile users in real time in multicast mode and meet the long-term QoE of users has become a technical problem to be solved urgently in the technical field of 360-degree video multicast.

SUMMARY

In view of this, objects of the present invention are to provide a system and method to realize real-time streaming of 360-degree video to mobile users in multicast mode, and to meet the long-term QoE of users.

In order to achieve the above objects, the present invention proposes a system for real-time transmission of a panoramic video, including a BMSC network element, a MBMS gateway, a wireless base station and a connecting link, and the system further includes following modules:

a data acquisition module deployed in the BMSC network element, wherein the data acquisition module is configured for: (1) integrating a 360-degree video stream uploaded by a service provider and report information uploaded by terminal mobile users, which specifically includes: mapping the 360-degree video stream uploaded by the service provider into a video in a planar format by using projection, then encoding the video in the planar format by using an encoding scheme, and finally dividing the encoded video into corresponding format MDP files based on a corresponding network protocol for transmission; detecting values of channel quality indicators CQIs of the terminal mobile users in real time, and collecting user's fields of view of a 360-degree video, numbers of re-buffering events, buffer lengths, average bitrate information for watched Fovs, space smoothness for the watched Fovs and time smoothness for the watched Fovs requested by the terminal mobile users during watching the video; (2) integrating multicast group information issued by a multicast management module, which specifically includes: the number of multicast groups G, the number of people in each of the multicast groups Gg, a radio resource allocated for each of the multicast groups Xg, a proportion of people watching each tile, a size of each tile, each bitrate quality function, and an average buffer length for users in each of the multicast groups; (3) integrating the above video stream data and user information data, and sending the integrated information to a video bitrate adaptive module, wherein the video stream data refers to size information, space coordinate information and all optional bitrate information of different segments tiles of the video, and the user information data is the multicast group information;

the video bitrate adaptive module deployed in the BMSC network element, wherein the video bitrate adaptive module includes a bitrate selection sub-module and a video issuing sub-module; and wherein the video bitrate adaptive module is configured for: selecting qualities, i.e., bitrates, for different segments tiles of the video for all terminal mobile users in each of the multicast groups by the bitrate selection sub-module, and forming a video data stream from different segments tiles of the video with corresponding bitrates and sending the video data stream to a content distribution sub-module of the multicast management module by the video issuing sub-module;

the multicast management module deployed in the MBMS gateway, wherein the multicast management module includes a group division and resource allocation sub-module and a content distribution sub-module; and wherein the multicast management module is configured for: (1) deciding whether to call the group division and resource allocation sub module for group division and resource allocation according to whether there is group division information in the MBMS gateway and whether received mobile user information changes; (2) performing group division and resource allocation by the group division and resource allocation sub-module, that is, dividing all mobile terminal users into different multicast groups, allocating radio resource blocks to different multicast groups, and sending the multicast group information to the data acquisition module; (3) after receiving the video data stream from the video bitrate adaptive module, distributing by the content distribution sub-module the video data stream to each of the mobile users of each of the groups by using a multicast technology.

Selecting bitrates for different segments tiles of the video for all terminal mobile users in each of the multicast groups by the bitrate selection sub-module specifically includes: (1) creating a state vector <Tg,Pg,u,d,Bg> for each of the multicast groups according to the video stream data and user information data received from the data acquisition module, wherein Tg is receiving rate information of the multicast group, Pg represents a proportion of the number of users requesting different segments tiles of the same video to the number of all users, u refers to sizes of different segments tiles of the video, d refers to the bitrate quality function, and Bg refers to the average buffer length for users in the multicast group; (2) inputting the state vector as an input into a deep reinforcement learning model, and inputting the average bitrate information of the watched Fovs, the space smoothness of the watched Fovs, the time smoothness of the watched Fovs and an average number of re-buffering events in the user report information as reward values into the deep reinforcement learning model; (3) selecting corresponding bitrates, i.e., action vectors, for different segments tiles of each video according to the state vector information by the deep reinforcement learning model, wherein dimensions of the action vectors are the same as the number of all selectable bitrates, a numerical value of each component of the action vectors represents a probability of selecting a corresponding bitrate; obtaining a bitrate selection strategy according to a maximum probability; forming bitrate selection strategies for all tiles after calling and sorting for multiple times, and sending the strategies to the video issuing sub-module.

Performing group division and resource allocation by the group division and resource allocation sub-module specifically includes performing group division and resource allocation according to following optimization problem:

$$\max_{G_g} \sum_{g=1}^{k} \frac{|G_g|}{M} \times \frac{\hat{c}_g \times x_g}{S} - O_g$$

subject to $\hat{c}_g = \min_{i \in G_g} c_i$ $|G_1 \cup G_2 \cup ... \cup G_k| = M$ $G_j \cap G_l = \emptyset, \forall j, l \le k, j \ne l$ $$x_g = \underset{x_g}{\operatorname{argmax}} \left\{ \sum_{g=1}^{k} |G_g| \log\left(\frac{\hat{c}_g \times x_g}{S}\right) - O_g : \sum_{g=1}^{k} x_g \le R \right\}$$

In the above equation, Gg represents a set of users in a group g, k represents the number of multicast groups, M represents the number of all users, $\hat{c}_g$ represents a modulation and coding mode of this group, in a unit of bits/RB, $c_i$ represents a modulation and coding mode of a user i, $x_g$ represents the number of radio resource blocks allocated to this group, S refers to the number of all time slots occupied by the radio resource blocks, $O_g$ represents an overlapping degree of Fovs requested by respective users in the group; a dynamic programming algorithm is used to solve the optimization problem.

The present invention also provides a method for real-time transmission of a panoramic video, comprising following operation steps of:
(1) integrating a 360-degree video stream uploaded by a service provider and report information uploaded by terminal mobile users by a data acquisition module, which specifically includes: mapping the 360-degree video stream uploaded by the service provider into a video in a planar format by using projection, then encoding the video in the planar format by using an encoding scheme, and finally dividing an encoded video into corresponding format MDP files based on a corresponding network protocol for transmission; detecting values of channel quality indicators CQIs of the terminal mobile users in real time, and collecting user's fields of view of a 360-degree video, numbers of re-buffering events, buffer lengths, average bitrate information for watched Fovs, space smoothness for the watched Fovs and time smoothness for the watched Fovs requested by the terminal mobile users during watching the video;
(2) performing group division and resource allocation and sending multicast group information to the data acquisition module by a group division and resource allocation sub-module of a multicast management module; wherein performing group division and resource allocation by the group division and resource allocation sub-module specifically includes performing group division and resource allocation according to following optimization problem:

$$\max_{G_g} \sum_{g=1}^{k} \frac{|G_g|}{M} \times \frac{\hat{c}_g \times x_g}{S} - O_g$$

subject to $\hat{c}_g = \min_{i \in G_g} c_i$ $|G_1 \cup G_2 \cup ... \cup G_k| = M$ $G_j \cap G_l = \emptyset, \forall j, l \le k, j \ne l$ $$x_g = \underset{x_g}{\operatorname{argmax}} \left\{ \sum_{g=1}^{k} |G_g| \log\left(\frac{\hat{c}_g \times x_g}{S}\right) - O_g : \sum_{g=1}^{k} x_g \le R \right\}$$

in the above equation, Gg represents a set of users in a group g, k represents the number of multicast groups, M represents the number of all users, $\hat{c}_g$ represents a modulation and coding mode of this group, in a unit of bits/RB, $c_i$ represents a modulation and coding mode of a user i, $x_g$ represents the number of radio resource blocks allocated to this group, S refers to the number of all time slots occupied by the radio resource blocks, $O_g$ represents an overlapping degree of Fovs requested by respective users in the group; a dynamic programming algorithm is used to solve the optimization problem;
(3) integrating the multicast group information and sending the multicast group information to a video bitrate adaptive module by the data acquisition module; wherein the multicast group information includes: the number of multicast groups G, the number of people in each of the multicast groups Gg, a radio resource allocated for each of the multicast groups Xg, a proportion of people watching each tile, a size of each tile, each bitrate quality function, and an average buffer length for users in each of the multicast groups;
(4) for each multicast group, selecting a lowest bitrate for all tiles, then calling, for each of the tiles, a deep reinforcement learning model to select a suitable bitrate for the tile and sending a bitrate decision to a video issuing sub module by a bitrate selection sub-module of the video bitrate adaptive module, which specifically includes: (4.1) creating a state vector <Tg,Pg,u,d,Bg> for each of the multicast groups according to the video stream data and user information data received from the data acquisition module, wherein Tg is receiving rate information of the multicast group, Pg represents a proportion of the number of users requesting different segments tiles of the same video to the number of all users, u refers to sizes of different segments tiles of the video, d refers to the bitrate quality function, and Bg refers to the average buffer length for users in the multicast group; (4.2) inputting the state vector as an input into a deep reinforcement learning model, and inputting the average bitrate information of the watched Fovs, the space smoothness of the watched Fovs, the time smoothness of the watched Fovs and an average number of re-buffering events in the user report information as reward values into the deep reinforcement learning model; (4.3) selecting corresponding bitrates, i.e., action vectors, for different segments tiles of each video according to the state vector information by the deep reinforcement learning model, wherein dimensions of the action vectors are the same as the number of all selectable bitrates, a numerical value of each component of the action vectors represents a probability of selecting a corresponding bitrate; obtaining a bitrate selection strategy according to a maximum probability; forming bitrate selection strategies for all tiles after calling and sorting for multiple times, and sending the strategies to the video issuing sub-module;

(5) downloading each corresponding tile by the video issuing sub-module after receiving the bitrate decision, to form video stream data and send the video stream data to a content distribution sub-module of the multicast management module;

(6) distributing video content of a corresponding multicast group to each of mobile terminal users of the group by applying a multicast technology by the content distribution sub-module;

(7) if new users join or existing users move at a specific speed resulting in changes in their channel conditions during above process and then user information reported by the MBMS gateway changes, triggering the multicast management module to call the group division and resource allocation sub-module again to re-perform group division and resource allocation, and repeating above steps (3) to (6).

The system and method of the present invention have the advantages that a new grouping method and a bitrate decision method are specially proposed for a 360-degree video. The grouping method takes into account fields of view of different users, thus effectively reducing the bandwidth consumption of repeated video segments, while ensuring user fairness and making full use of network bandwidth resources when allocating resources. The system and method of the invention can maximize the long-term QoE of users under the condition of limited bandwidth, and avoid the problem that the existing schemes are complex and difficult to meet real-time requirements of users.

DETAILED DESCRIPTION

In order to make the objective, technical solutions and advantages of the present disclosure clearer, the present disclosure will be described in more detail below with reference to the accompanying drawings.

Figure 1:
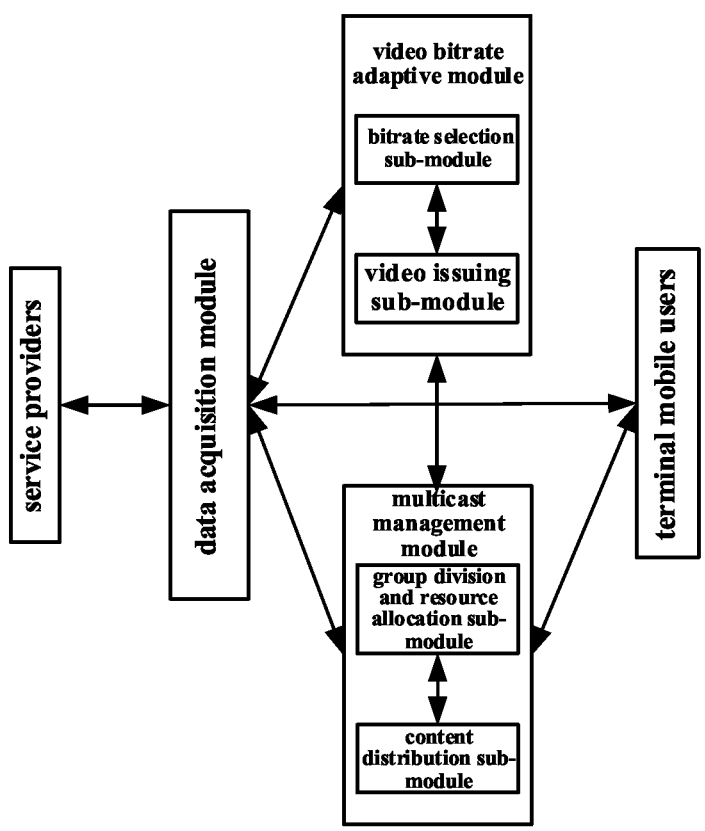
FIG. 1 is a schematic modular diagram of a system for real-time transmission of a panoramic video according to the invention.

Referring to FIG. 1, a system for real-time transmission of a panoramic video according to the invention includes a BMSC (Broadcast Multicast Service Center) network element, a MBMS Multimedia Broadcast Multicast Service) gateway, a wireless base station and a connecting link. The system further includes following modules:

a data acquisition module deployed in the BMSC network element, wherein the data acquisition module is configured for:

(1) integrating a 360-degree video stream uploaded by a service provider and report information uploaded by terminal mobile users, which specifically includes: mapping the 360-degree video stream uploaded by the service provider into a video in a planar format by using projection (using ERP (equirectangular projection) in an example), then encoding the video in the planar format by using an encoding scheme (using H.265/H.264 in an example), and finally dividing the encoded video into corresponding format MDP (Media Presentation Description) files based on a corresponding network protocol (using DASH (Dynamic Adaptive Streaming over HTTP) protocol in an example) for transmission; detecting values of CQIs (Channel Quality Indicators) of the terminal mobile users in real time, and collecting Fovs (Fields of view) of a 360-degree video, numbers of re-buffering events, buffer lengths, average bitrate information of watched Fovs, space smoothness of the watched Fovs and time smoothness of the watched Fovs requested by the terminal mobile users during watching the video.

In the embodiment, the data acquisition module first segments the 360-degree video uploaded by the service provider into rectangular blocks with equal or unequal sizes, which are called tiles. For example, the 360-degree video is divided with a fixed size of 4×4 or 5×5.

The average bitrate information of the watched Fovs refers to the average bitrate of all different segments tiles of the video included in the watched Fovs. For example, if the watched Fovs include tile1 and tile2, whose bitrates are 512 kbps and 768 kbps respectively, the average bitrate of the watched Fovs is 640 kbps.

The space smoothness of the watched Fovs refers to a standard deviation between bitrates of respective tiles of the watched Fovs. For example, if the watched Fovs include tile1 and tile2, whose bitrates are 512 kbps and 768 kbps respectively, the average bitrate of the watched Fovs is 640 kbps, and the standard deviation between the bitrates is 128 kbps.

The time smoothness of the watched Fovs refers to a difference between a first average bitrate and a second average bitrate of the watched Fovs. For example, if the first average bitrate is 640 kbps and the second average bitrate is 768 kbps, the time smoothness of the watched Fovs is 128 kbps.

(2) integrating multicast group information issued by a multicast management module, which specifically includes: the number of multicast groups G, the number of people in each of the multicast groups Gg, a radio resource allocated for each of the multicast groups Xg, a proportion of people watching each tile, a size of each tile, each bitrate quality function, and an average buffer length for users in each of the multicast groups; (3) integrating the above video stream data and user information data, and sending the integrated information to a video bitrate adaptive module, wherein the video stream data refers to size information (for example 1 kb), space coordinate information and all optional bitrate information of different segments tiles of the video, and the user information data is the multicast group information.

A radio resource block refers to a resource unit of a traffic channel resource allocation. In an example, it occupies a time slot of 0.5 ms and 12 subcarriers, with a bandwidth of 180 kHz. In the example, each bitrate quality function adopts f(x)=x. That is, the bitrate is directly used to represent a video quality;

the video bitrate adaptive module deployed in the BMSC network element, wherein the video bitrate adaptive module includes a bitrate selection sub module and a video issuing sub-module; and wherein the video bitrate adaptive module is configured for: selecting qualities, i.e., bitrates, for different segments tiles of the video for all terminal mobile users in each of the multicast groups by the bitrate selection sub-module, and forming a video data stream from different segments tiles of the video with corresponding bitrates and sending the video data stream to a content distribution sub-module of the multicast management module by the video issuing sub-module;

the multicast management module deployed in the MBMS gateway, wherein the multicast management module includes a group division and resource allocation sub-module and a content distribution sub-module; and wherein the multicast management module is configured for: (1) deciding whether to call the group division and resource allocation sub module for group division and resource allocation according to whether there is group division information in the MBMS gateway and whether received mobile user information changes; (2) performing group division and resource allocation by the group division and resource allocation sub-module, that is, dividing all mobile terminal users into different multicast groups, allocating radio resource blocks to different multicast groups, and sending the multicast group information to the data acquisition module; (3) after receiving the video data stream from the video bitrate adaptive module, distributing by the content distribution sub-module the video data stream to each of the mobile users of each of the groups by using a multicast technology.

Selecting bitrates for different segments tiles of the video for all terminal mobile users in each of the multicast groups by the bitrate selection sub-module specifically includes: (1) creating a state vector <Tg,Pg,u,d,Bg> for each of the multicast groups according to the video stream data and user information data received from the data acquisition module, wherein Tg is receiving rate information of the multicast group, which is calculated by multiplying the number of radio resource blocks (RB) of the multicast group by a corresponding modulation and coding mode in a unit of bits/RB, Pg represents a proportion of the number of users requesting different segments tiles of the same video to the number of all users, u refers to sizes of different segments tiles of the video, d refers to the bitrate quality function, and Bg refers to the average buffer length for users in the multicast group; (2) inputting the state vector as an input into a deep reinforcement learning model, and inputting the average bitrate information of the watched Fovs, the space smoothness of the watched Fovs, the time smoothness of the watched Fovs and an average number of re-buffering events in the user report information as reward values into the deep reinforcement learning model; (3) selecting corresponding bitrates, i.e., action vectors, for different segments tiles of each video according to the state vector information by the deep reinforcement learning model, wherein dimensions of the action vectors are the same as the number of all selectable bitrates, a numerical value of each component of the action vectors represents a probability of selecting a corresponding bitrate; obtaining a bitrate selection strategy according to a maximum probability; forming bitrate selection strategies for all tiles after calling and sorting for multiple times, and sending the strategies to the video issuing sub-module. In the example, the deep reinforcement learning model is an AC (Actor Critical) model, which can also be replaced by other deep reinforcement learning models.

For example, it is supposed there are five bitrate levels for selection, namely, 500 kbps, 1000 kbps, 2000 kbps, 5000 kbps and 10000 kbps, then the dimension of the action vector is 5. If a value of the action vector is (0.1,0.1,0.2, 0.5,0.1), it is indicated that the probability of selection of 5000 kbps is the highest, which is 0.5. Therefore, the bitrate selection strategy is to select 5000 kbps.

Performing group division and resource allocation by the group division and resource allocation sub-module specifically includes performing group division and resource allocation according to following optimization problem:

$$\max_{G_g} \sum_{g=1}^{k} \frac{|G_g|}{M} \times \frac{\hat{c}_g \times x_g}{S} - O_g$$

$$\text{subject to } \hat{c}_g = \min_{i \in G_g} c_i$$

$$|G_1 \cup G_2 \cup \ldots \cup G_k| = M$$

$$G_j \cap G_l = \emptyset, \forall j, l \le k, j \ne l$$

$$x_g = \operatorname*{argmax}_{x_g} \left\{ \sum_{g=1}^{k} |G_g| \log\left(\frac{\hat{c}_g \times x_g}{S}\right) - O_g : \sum_{g=1}^{k} x_g \le R \right\}$$

In the above equation, Gg represents the set of users in a group g, k represents the number of multicast groups, M represents the number of all users, $\hat{c}_g$ represents a modulation and coding mode of this group, in a unit of bits/RB, $c_i$ represents the modulation and coding mode of a user i, $x_g$ represents the number of radio resource blocks allocated to this group, S refers to the number of all time slots occupied by the radio resource blocks, $O_g$ represents an overlapping degree of Fovs requested by respective users in the group. In an example, the overlap degree of Fov is measured by an average distance between center coordinates of Fovs of respective users in the group. For example, if coordinates corresponding to centers of Fovs of three users are (0,0), (0,3) and (4,0) respectively, the distance between these coordinates are 3, 4, 5, and the average distance, that is, the overlap degree of Fov, is 4.

A dynamic programming algorithm is used to solve the above optimization problem.

Figure 2:
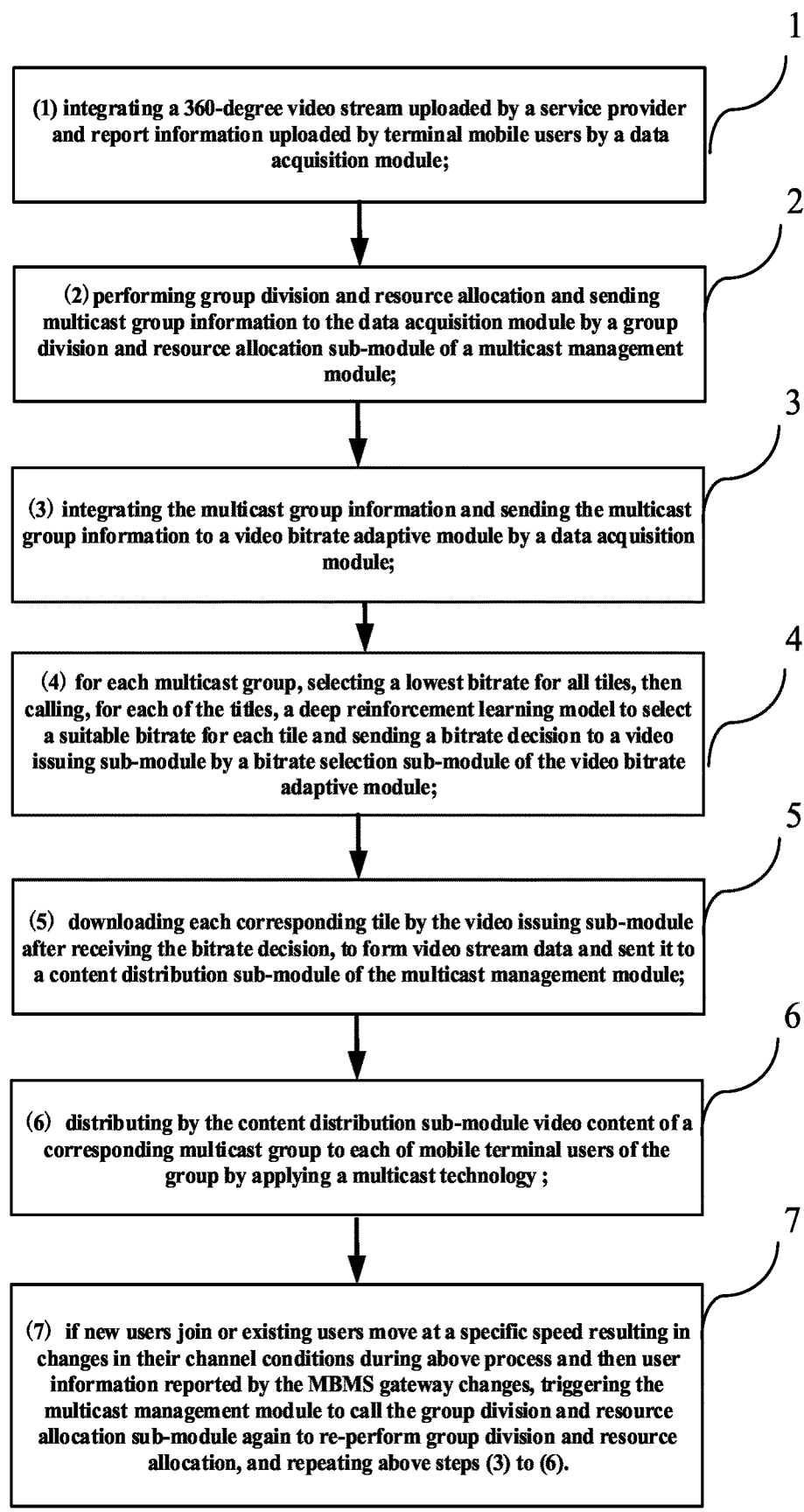
FIG. 2 is a flowchart of a method for real-time transmission of a panoramic video according to the invention.

Referring to FIG. 2, a method for real-time transmission of a panoramic video according to the present invention is described, which includes following operation steps of:

(1) integrating a 360-degree video stream uploaded by a service provider and report information uploaded by terminal mobile users by a data acquisition module, which specifically includes: mapping the 360-degree video stream uploaded by the service provider into a video in a planar format by using projection, then encoding the video in the planar format by using an encoding scheme, and finally dividing an encoded video into corresponding format MDP files based on a corresponding network protocol for transmission; detecting values of channel quality indicators CQIs of the terminal mobile users in real time, and collecting user's fields of view of a 360-degree video, numbers of re-buffering events, buffer lengths, average bitrate information for watched Fovs, space smoothness for the watched Fovs and time smoothness for the watched Fovs requested by the terminal mobile users during watching the video;

(2) performing group division and resource allocation and sending multicast group information to the data acquisition module by a group division and resource allocation sub-module of a multicast management module; wherein performing group division and resource allocation by the group division and resource allocation sub-module specifically includes performing group division and resource allocation according to following optimization problem:

$$\max_{G_g} \sum_{g=1}^{k} \frac{|G_g|}{M} \times \frac{\hat{c}_g \times x_g}{S} - O_g$$

$$\text{subject to } \hat{c}_g = \min_{i \in G_g} c_i$$

$$|G_1 \cup G_2 \cup \ldots \cup G_k| = M$$

$$G_j \cap G_l = \emptyset, \forall j, l \leq k, j \neq l$$

$$x_g = \underset{x_g}{\operatorname{argmax}} \left\{ \sum_{g=1}^{k} |G_g| \log\left(\frac{\hat{c}_g \times x_g}{S}\right) - O_g : \sum_{g=1}^{k} x_g \leq R \right\}$$

in the above equation, $G_g$ represents a set of users in a group g, k represents the number of multicast groups, M represents the number of all users, $\hat{c}_g$ represents a modulation and coding mode of this group, in a unit of bits/RB, $c_i$ represents a modulation and coding mode of a user i, $x_g$ represents the number of radio resource blocks allocated to this group, S refers to the number of all time slots occupied by the radio resource blocks, $O_g$ represents an overlapping degree of Fovs requested by respective users in the group; a dynamic programming algorithm is used to solve the optimization problem;

(3) integrating the multicast group information and sending the multicast group information to a video bitrate adaptive module by the data acquisition module; wherein the multicast group information includes: the number of multicast groups G, the number of people in each of the multicast groups Gg, a radio resource allocated for each of the multicast groups Xg, a proportion of people watching each tile, a size of each tile, each bitrate quality function, and an average buffer length for users in each of the multicast groups; in an example, the multicast group information is in a format of json (JavaScript Object Notation);

(4) for each multicast group, selecting a lowest bitrate for all tiles, then calling, for each of the tiles, a deep reinforcement learning model to select a suitable bitrate for the tile and sending a bitrate decision to a video issuing sub module by a bitrate selection sub-module of the video bitrate adaptive module, which specifically includes: (4.1) creating a state vector <Tg,Pg,u,d,Bg> for each of the multicast groups according to the video stream data and user information data received from the data acquisition module, wherein Tg is receiving rate information of the multicast group, Pg represents a proportion of the number of users requesting different segments tiles of the same video to the number of all users, u refers to sizes of different segments tiles of the video, d refers to the bitrate quality function, and Bg refers to the average buffer length for users in the multicast group; (4.2) inputting the state vector as an input into a deep reinforcement learning model, and inputting the average bitrate information of the watched Fovs, the space smoothness of the watched Fovs, the time smoothness of the watched Fovs and an average number of re-buffering events in the user report information as reward values into the deep reinforcement learning model; (4.3) selecting corresponding bitrates, i.e., action vectors, for different segments tiles of each video according to the state vector information by the deep reinforcement learning model, wherein dimensions of the action vectors are the same as the number of all selectable bitrates, a numerical value of each component of the action vectors represents a probability of selecting a corresponding bitrate; obtaining a bitrate selection strategy according to a maximum probability; forming bitrate selection strategies for all tiles after calling and sorting for multiple times, and sending the strategies to the video issuing sub-module; in an example, bitrate decision information is in a format of json (JavaScript Object Notation);

(5) downloading each corresponding tile by the video issuing sub-module after receiving the bitrate decision, to form video stream data and send the video stream data to a content distribution sub-module of the multicast management module;

(6) distributing video content of a corresponding multicast group to each of mobile terminal users of the group by applying a multicast technology by the content distribution sub-module;

(7) if new users join or existing users move at a specific speed resulting in changes in their channel conditions during above process and then user information reported by the MBMS gateway changes, triggering the multicast management module to call the group division and resource allocation sub-module again to re-perform group division and resource allocation, and repeating above steps (3) to (6).

A lot of experiments have been carried out on the proposed system and method. Experimental results show that the proposed system and method are feasible and effective.

The invention claimed is:

1. A system for real-time transmission of a panoramic video, comprising a BMSC network element, a MBMS gateway, a wireless base station and a connecting link, wherein the system further comprises following modules:
   a data acquisition module deployed in the BMSC network element, wherein the data acquisition module is configured for: (1) integrating a 360-degree video stream uploaded by a service provider and report information uploaded by terminal mobile users, which specifically comprises: mapping the 360-degree video stream uploaded by the service provider into a video in a planar format by using projection, then encoding the video in the planar format by using an encoding scheme, and finally dividing an encoded video into corresponding format MDP files based on a corresponding network protocol for transmission; detecting values of channel quality indicators CQIs of the terminal mobile users in real time, and collecting Fields of view Fovs of a 360-degree video, numbers of re-buffering events, buffer lengths, average bitrate information for watched Fovs, space smoothness for the watched Fovs and time smoothness for the watched Fovs requested by the terminal mobile users during watching the video; (2) integrating multicast group information issued by a multicast management module, which specifically comprises: the number of multicast groups G, the number of people in each of the multicast groups Gg, a radio resource allocated for each of the multicast groups Xg, a proportion of people watching each tile, a size of each tile, each bitrate quality function, and an average buffer length for users in each of the multicast groups; (3) integrating video stream data and user information data, and sending integrated information to a video bitrate adaptive module, wherein the video stream data refers to size information, space coordinate information and all optional bitrate information of different segments tiles of the video, and the user information data is the multicast group information;

the video bitrate adaptive module deployed in the BMSC network element, wherein the video bitrate adaptive module comprises a bitrate selection sub-module and a video issuing sub-module; and wherein the video bitrate adaptive module is configured for: selecting qualities, i.e., bitrates, for different segments tiles of the video for all terminal mobile users in each of the multicast groups by the bitrate selection sub-module, and forming a video data stream from different segments tiles of the video with corresponding bitrates and sending the video data stream to a content distribution sub-module of the multicast management module by the video issuing sub-module;

the multicast management module deployed in the MBMS gateway, wherein the multicast management module comprises a group division and resource allocation sub-module and a content distribution sub-module; and wherein the multicast management module is configured for: (1) deciding whether to call the group division and resource allocation sub module for group division and resource allocation according to whether there is group division information in the MBMS gateway and whether received mobile user information changes; (2) performing group division and resource allocation by the group division and resource allocation sub-module, that is, dividing all mobile terminal users into different multicast groups, allocating radio resource blocks to different multicast groups, and sending the multicast group information to the data acquisition module; (3) after receiving the video data stream from the video bitrate adaptive module, distributing by the content distribution sub-module the video data stream to each of the mobile users of each of the groups by using a multicast technology.

2. The system for real-time transmission of a panoramic video according to claim 1, wherein selecting bitrates, for different segments tiles of the video for all terminal mobile users in each of the multicast groups by the bitrate selection sub-module specifically comprises: (1) creating a state vector <Tg,Pg,u,d,Bg> for each of the multicast groups according to the video stream data and user information data received from the data acquisition module, wherein Tg is receiving rate information of the multicast group, Pg represents a proportion of the number of users requesting different segments tiles of the same video to the number of all users, u refers to sizes of different segments tiles of the video, d refers to the bitrate quality function, and Bg refers to the average buffer length for users in the multicast group; (2) inputting the state vector as an input into a deep reinforcement learning model, and inputting the average bitrate information of the watched Fovs, the space smoothness of the watched Fovs, the time smoothness of the watched Fovs and an average number of re-buffering events in the user report information as reward values into the deep reinforcement learning model; (3) selecting corresponding bitrates, i.e., action vectors, for different segments tiles of each video according to the state vector information by the deep reinforcement learning model, wherein dimensions of the action vectors are the same as the number of all selectable bitrates, a numerical value of each component of the action vectors represents a probability of selecting a corresponding bitrate; obtaining a bitrate selection strategy according to a maximum probability; forming bitrate selection strategies for all tiles after calling and sorting for multiple times, and sending the strategies to the video issuing sub-module.

3. The system for real-time transmission of a panoramic video according to claim 1, wherein performing group division and resource allocation by the group division and resource allocation sub-module specifically comprises performing group division and resource allocation according to following optimization problem:

$$\max_{G_g} \sum_{g=1}^{k} \frac{|G_g|}{M} \times \frac{\hat{c}_g \times x_g}{S} - O_g$$

$$\text{subject to } \hat{c}_g = \min_{i \in G_g} c_i$$

$$|G_1 \cup G_2 \cup \ldots \cup G_k| = M$$

$$G_j \cap G_l = \emptyset, \forall j, l \le k, j \ne l$$

$$x_g = \arg\max_{x_g} \left\{ \sum_{g=1}^{k} |G_g| \log\left(\frac{\hat{c}_g \times x_g}{S}\right) - O_g : \sum_{g=1}^{k} x_g \le R \right\}$$

in the above equation, Gg represents a set of users in a group g, k represents the number of multicast groups, M represents the number of all users, $\hat{c}_g$ represents a modulation and coding mode of this group, in a unit of bits/RB, $c_i$ represents a modulation and coding mode of a user i, $x_g$ represents the number of radio resource blocks allocated to this group, S refers to the number of all time slots occupied by the radio resource blocks, $O_g$ represents an overlapping degree of Fovs requested by respective users in the group; a dynamic programming algorithm is used to solve the optimization problem.

4. A method for real-time transmission of a panoramic video, wherein the method comprises following operation steps of:
(1) integrating a 360-degree video stream uploaded by a service provider and report information uploaded by terminal mobile users by a data acquisition module, which specifically comprises: mapping the 360-degree video stream uploaded by the service provider into a video in a planar format by using projection, then encoding the video in the planar format by using an encoding scheme, and finally dividing an encoded video into corresponding format MDP files based on a corresponding network protocol for transmission; detecting values of channel quality indicators CQIs of the terminal mobile users in real time, and collecting user's fields of view of a 360-degree video, numbers of re-buffering events, buffer lengths, average bitrate information for watched Fovs, space smoothness for the watched Fovs and time smoothness for the watched Fovs requested by the terminal mobile users during watching the video;
(2) performing group division and resource allocation and sending multicast group information to the data acquisition module by a group division and resource allocation sub-module of a multicast management module; wherein performing group division and resource allocation by the group division and resource allocation sub-module specifically comprises performing group division and resource allocation according to following optimization problem:

$$\max_{G_g} \sum_{g=1}^{k} \frac{|G_g|}{M} \times \frac{\hat{c}_g \times x_g}{S} - O_g$$

subject to $\hat{c}_g = \min_{i \in G_g} c_i$ $|G_1 \cup G_2 \cup \ldots \cup G_k| = M$ $G_j \cap G_l = \emptyset, \forall j, l \leq k, j \neq l$ $x_g = \underset{x_g}{\operatorname{argmax}} \left\{ \sum_{g=1}^{k} |G_g| \log\left(\frac{\hat{c}_g \times x_g}{S}\right) - O_g : \sum_{g=1}^{k} x_g \leq R \right\}$ in the above equation, Gg represents a set of users in a group g, k represents the number of multicast groups, M represents the number of all users, $\hat{c}_g$ represents a modulation and coding mode of this group, in a unit of bits/RB, $c_i$ represents a modulation and coding mode of a user i, $x_g$ represents the number of radio resource blocks allocated to this group, S refers to the number of all time slots occupied by the radio resource blocks, $O_g$ represents an overlapping degree of Fovs requested by respective users in the group; a dynamic programming algorithm is used to solve the optimization problem;

(3) integrating the multicast group information and sending the multicast group information to a video bitrate adaptive module by the data acquisition module; wherein the multicast group information comprises: the number of multicast groups G, the number of people in each of the multicast groups Gg, a radio resource allocated for each of the multicast groups Xg, a proportion of people watching each tile, a size of each tile, each bitrate quality function, and an average buffer length for users in each of the multicast groups;

(4) for each multicast group, selecting a lowest bitrate for all tiles, then calling, for each of the tiles, a deep reinforcement learning model to select a suitable bitrate for the tile and sending a bitrate decision to a video issuing sub module by a bitrate selection sub-module of the video bitrate adaptive module, which specifically comprises: (4.1) creating a state vector <Tg,Pg,u,d,Bg> for each of the multicast groups according to the video stream data and user information data received from the data acquisition module, wherein Tg is receiving rate information of the multicast group, Pg represents a proportion of the number of users requesting different segments tiles of the same video to the number of all users, u refers to sizes of different segments tiles of the video, d refers to the bitrate quality function, and Bg refers to the average buffer length for users in the multicast group; (4.2) inputting the state vector as an input into a deep reinforcement learning model, and inputting the average bitrate information of the watched Fovs, the space smoothness of the watched Fovs, the time smoothness of the watched Fovs and an average number of re-buffering events in the user report information as reward values into the deep reinforcement learning model; (4.3) selecting corresponding bitrates, i.e., action vectors, for different segments tiles of each video according to the state vector information by the deep reinforcement learning model, wherein dimensions of the action vectors are the same as the number of all selectable bitrates, a numerical value of each component of the action vectors represents a probability of selecting a corresponding bitrate; obtaining a bitrate selection strategy according to a maximum probability; forming bitrate selection strategies for all tiles after calling and sorting for multiple times, and sending the strategies to the video issuing sub-module;

(5) downloading each corresponding tile by the video issuing sub-module after receiving the bitrate decision, to form video stream data and send the video stream data to a content distribution sub-module of the multicast management module;

(6) distributing video content of a corresponding multicast group to each of mobile terminal users of the group by applying a multicast technology by the content distribution sub-module;

(7) if new users join or existing users move at a specific speed resulting in changes in their channel conditions during above process and then user information reported by the MBMS gateway changes, triggering the multicast management module to call the group division and resource allocation sub module again to re-perform group division and resource allocation, and repeating above steps (3) to (6).

* * * * *